United States Patent [19]

Heesch et al.

[11] Patent Number: 4,657,304
[45] Date of Patent: Apr. 14, 1987

[54] ADJUSTABLE HEADREST

[75] Inventors: Max O. Heesch, Ypsilanti; James T. Baker, Ann Arbor, both of Mich.

[73] Assignee: ITT Corporation, New York, N.Y.

[21] Appl. No.: 871,449

[22] Filed: Jun. 6, 1986

[51] Int. Cl.[4] ............................................. A47C 7/36
[52] U.S. Cl. .................................. 297/391; 297/409; 74/89.15
[58] Field of Search ............... 297/391, 409, 408, 284, 297/406, 430; 74/89.15, 424.8 R

[56] References Cited

U.S. PATENT DOCUMENTS

| | | | |
|---|---|---|---|
| 1,580,606 | 4/1926 | Jones | 297/284 |
| 2,434,007 | 1/1948 | O'Dea | 297/409 X |
| 2,460,942 | 2/1949 | Marshall | 297/399 |
| 4,191,422 | 3/1980 | Inasawa et al. | 297/391 |
| 4,250,762 | 2/1981 | Weatherby | 74/424.8 R X |
| 4,278,291 | 7/1981 | Asai | 297/391 |
| 4,339,150 | 7/1982 | McNamara et al. | 297/284 |
| 4,469,374 | 9/1984 | Kashihara et al. | 297/284 |
| 4,531,779 | 7/1985 | Hashimoto | 297/284 |

FOREIGN PATENT DOCUMENTS

| | | | |
|---|---|---|---|
| 0026668 | 4/1981 | European Pat. Off. | 297/284 |
| 2360165 | 6/1975 | Fed. Rep. of Germany | 297/284 |
| 3048688 | 9/1981 | Fed. Rep. of Germany | 297/409 |
| 0027124 | 3/1977 | Japan | 297/284 |
| 1365348 | 9/1974 | United Kingdom | 297/284 |

*Primary Examiner*—Peter A. Aschenbrenner
*Assistant Examiner*—José V. Chen
*Attorney, Agent, or Firm*—James B. Raden; Donald J. Breh

[57] ABSTRACT

A reversibly extensible headrest for an automotive vehicle is disclosed including a three link triangular linkage arrangement having a transverse manual or motor operated shaft oppositely threaded along two portions, at least one pair of links each mounted to the headrest at a common pivot point and to a respective one of the oppositely threaded portions. A third link is mounted to the headrest spaced from the common pivot point and one of the threaded portions. The mounting of the links to the threaded shaft being by way of corresponding threaded nuts. In the extended position the one pair of links are maintained in longitudinal side-by-side abutment providing lateral stability to the headrest.

8 Claims, 7 Drawing Figures

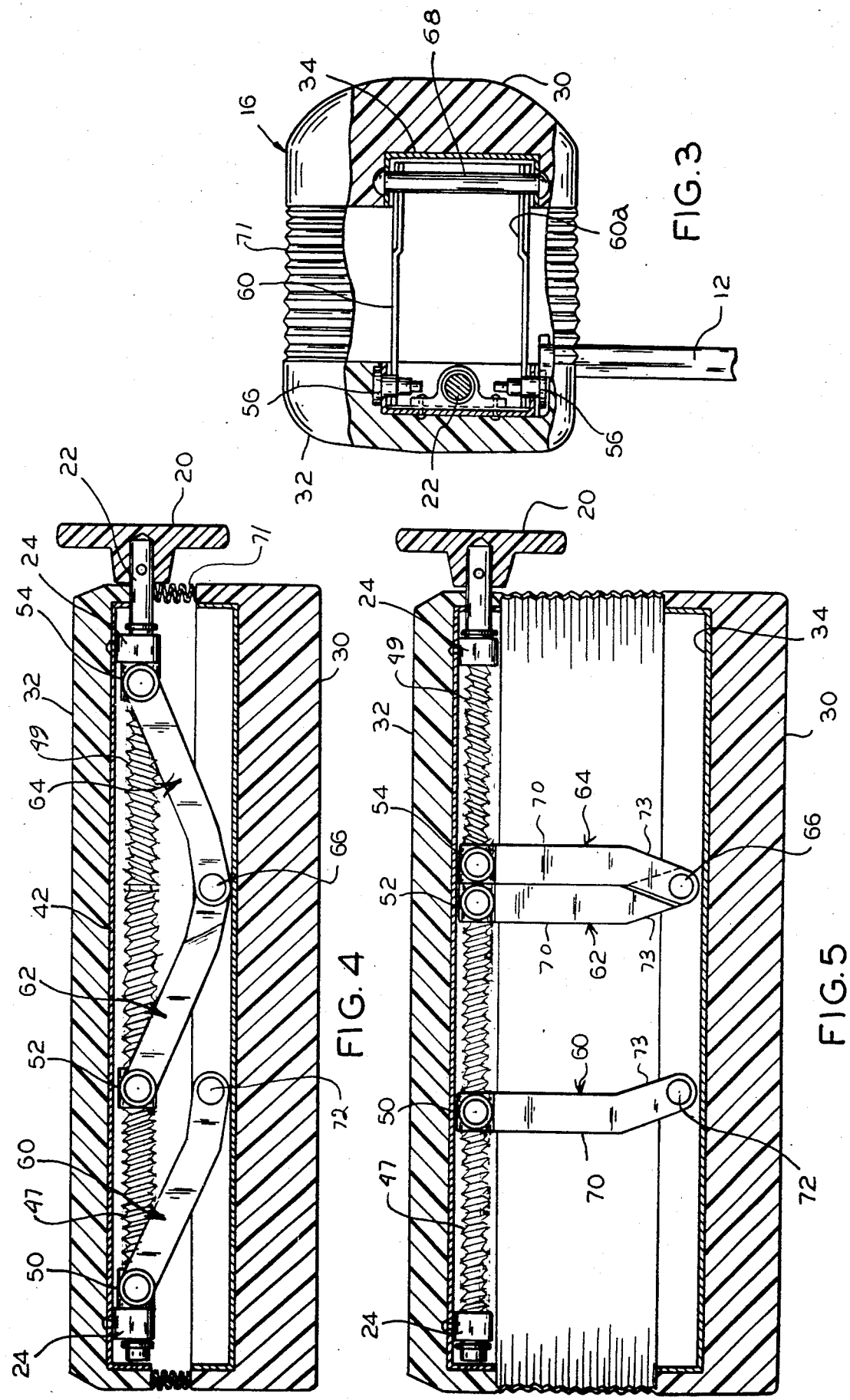

ADJUSTABLE HEADREST

BACKGROUND OF THE INVENTION

Headrests for vehicle seats are required to be adjustable vertically. Pivotal adjustment principles are shown by such patents as U.S. Pat. No. 4,304,439 issued Dec. 8, 1981 to Terada. Horizontal headrest movement for vehicle seats is shown by U.S. Pat. No. 4,191,422 issued Mar. 4, 1890 to Insawa. Horizontal movement of headrest for barber chairs is shown by such patents as 2,434,007 issued to F. O'Dea Jan. 6, 1948 and 2,460,942 to A. Marshall on Feb. 8, 1949.

Also, the patent to Gregory U.S. Pat. No. 4,295,681 discloses a two link arrangement mounted on oppositely threaded shaft portions for extending and retracting a lumbar support and the patent to Kashihara et al. U.S. Pat. No. 4,469,374 discloses another two link arrangement on a threaded shaft for causing a tilting motion of a portion of a seat back.

These patents show many types of movement for a headrest and seat back ranging from gear actuated linkages (Terada), rack and pinion (Insawa), pivoted link (O'Dea), pantograph structures (Marshall) and threaded rod actuated links (Gregory and Kashihara et al.).

SUMMARY OF THE INVENTION

The present invention is directed to an improved apparatus for adjusting the horizontal position of a headrest for an automotive vehicle seat. The headset is infinitely adjustable over an adjustment range of approximately 5 inches between its fully advanced position and a normal retracted position. The adjustment is controlled through a manual knob at one transverse side of the headrest or by means of a switch controlled motor. The headrest once set remains at the setting until reset to another setting by readjustment of the knob or by actuation of the switch operating the motor drive.

To accomplish these results, the manually adjustable knob, manual type or the motor in the powered type, is directly affixed to one end of the threaded lead screw or threaded rod extending the width of the headrest adjacent the rear wall thereof. The lead screw includes two oppositely threaded portions, each threaded portion extends from a respective one of the ends of the shaft. Three nuts or internally threaded blocks are spaced along the threaded rod. Two of the nuts are internally threaded in a direction corresponding to the thread direction along one portion of the shaft for receipt thereon and the third nut is internally threaded opposite to the other two nuts in a direction corresponding to the direction of the thread along the other portion of the shaft.

According to the invention, a three link triangular linkage system is provided for including a first pair of rigid links pivotably attached at one end to the headrest pad support at a common pivot point and having the opposite end of one of the links of the pair pivotably attached to the one block which is singularly positioned on one threaded portion of the shaft and having the opposite end of the second of the pair of links pivotably attached to one of the pair of blocks which share the oppositely threaded portion of the shaft.

According to the invention, the third rigid link is pivotably attached at one end to the headrest support at a second point spaced apart from the common pivot point of the link pair and has its opposite end pivotably attached to the second of the pair of blocks which share the same threaded portion of the shaft.

On rotation of the knob, or on operation of the motor, the lead screw rotates to move the nuts in the direction corresponding to the direction of the mating threads. In one direction of rotation of the lead screw the links are moved to assume a lateral diagonal position and pull the head rest toward a retracted position whereas when the lead screw is rotated in the opposite direction the links move from their lateral diagonal positions to longitudinal positions thereby moving the headrest front pad away from the rear pad to an extended position. The three link triangular linkage structure provides for both longitudinal and lateral rigid support of the front pad.

According to a further aspect of the invention, the triangular linkage is provided with both top and bottom links attached to the pad support by either elongated pintle or individual pivot pins.

A still further important feature provides for a least the pair of links which are attached at the common pivot point to have acutely angle overlapping oppositely stepped end portions at the common pivot point providing for parallel side by side abutment of the link pair when in the fully extended position to further rigidly laterally support the headrest pad.

The exterior of the headrest along its intermediate longitudinal sides may be accordion pleated, may use stretch fabric or may be telescoped to produce a surface without gaps when the headrest is in its fully advanced position.

BRIEF DESCRIPTION OF THE DRAWINGS

FIG. 3 is a sectional view taken along line 3—3 of FIG. 1, this figure showing the headrest in the fully advanced or extended condition;

FIG. 4 is a section view taken along line 4—4 of FIG. 1, this figure showing the headrest in the retracted condition;

FIG. 5 is a sectional view similar to FIG. 4 showing the headrest in the fully advanced condition;

DETAILED DESCRIPTION

Figure 1:
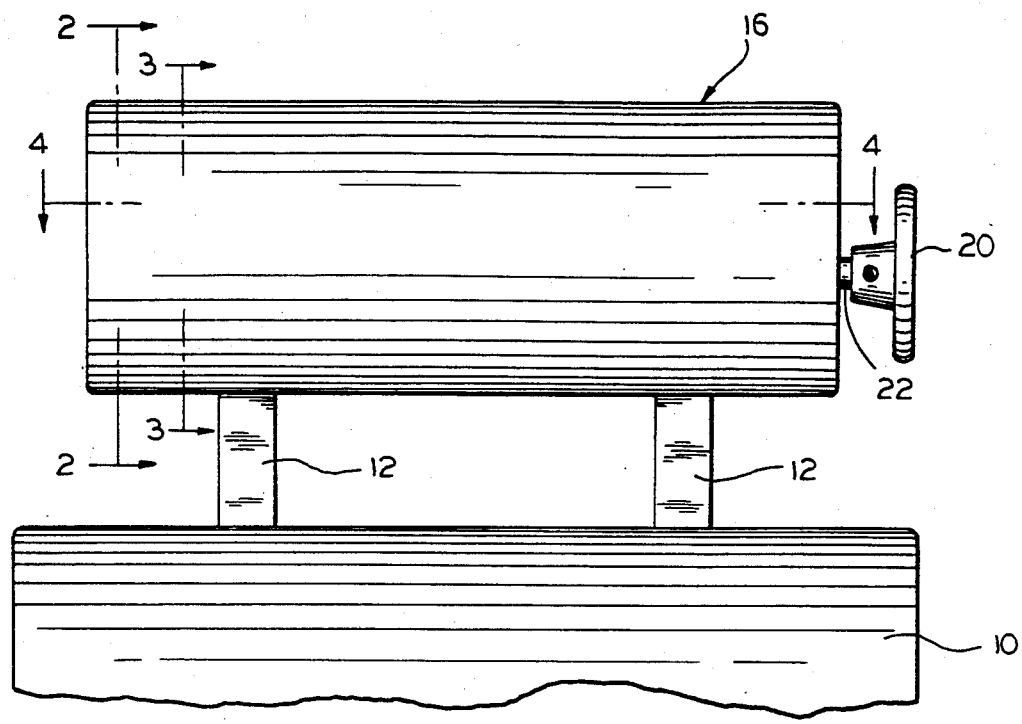
FIG. 1 is a front view of the headrest of the manual type employing the present invention.

In FIG. 1 is shown a seat back 10 from which arise two laterally spaced rectangular posts or supports 12 which extend vertically from a fixed mounting within the seat back, as is conventional. The post supports 12 are preferably rigid steel strap posts with sufficient structural rigidity to hold the headrest 16 firmly a distance above the top of the seat back. These post supports may also be tubular support members, if desired. Adjustment of the height of the headrest is conventional and has been used in many forms on headrests since headrests have been mandated. Such vertical adjustments are outside the scope of the present invention.

Also visible in FIG. 1 at the right of the headrest is a manual knob 20 rotatable on a horizontal axis. The knob is pinned on one end of a horizontal shaft 22 to cause rotation of the shaft on rotation of the knob. The shaft 22 extends into the side of the headrest; the shaft being shown in greater detail in FIGS. 3–5. The shaft 22 rides within two laterally spaced bearings 24 and is threaded in the space between the bearings with two oppositely directed threads 47, 49 of conventional type.

The headrest 16 itself has a front pad assembly 30, and a rear section 32 joined across a line of separation. The front pad assembly is conventionally cushioned at its front and sides. The front assembly is mounted on a front pad support frame 34 of metal strapping shaped in rectangular open box form essentially at the center rear of the front pad assembly.

The rear section may, if desired, be padded at the rear and sides and has an opening 40 at the front center in which the rear support frame 42 is mounted. The rear support frame 42 is an open box like frame of heavy, rigid sheet stock mounted securely on the support posts rising from the seat back. The mounting may be by welding, bolting or the like to produce the required secure mounting.

Affixed to the center of the rear support frame adjacent the lateral sides of the frame are the two bearings 24, previously referred to, which bear the laterally extending shaft 22 for rotation and with no longitudinal or axial shaft movement. As mentioned, the shaft 22 includes two oppositely threaded portions 47, 49 extending the full distance between the bearings. On one of the threaded shaft portions 47 there are two spaced apart nuts or internally threaded blocks 50, 52 and on the other oppositely threaded portion 49 there is a third internally threaded nut or block 54.

Each nut, such as nut 50 of FIG. 3, is elongated vertically and each has a shoulder screw 56 secured to it at the top and a shoulder screw at the bottom, both screws being threaded into respective openings in the nut to join respective top and bottom links to the nut. Thus for nut 50, there is a top link 60 and a bottom link 60a. For nut 52 there is a top link 62 and a corresponding bottom link (not shown) and for nut 54 there is a top link 64 and a corresponding bottom link (not shown). The links are preferably sheet steel bars.

In the embodiment shown, the threaded portion 47 includes a right handed thread and the nuts 50 and 52 include corresponding internal threads for mating therewith, and the portion 49 of the shaft includes a left handed thread which mates with a corresponding internally threaded block on nut 54.

Each link has its far or front end pinned to an intermediate point on the front pad assembly frame. Links 62 and 64 are pinned at a common point 66 to complete a generally triangular linkage while link 60 is pivotably pinned and spaced from point 66 at point 72. Like pin connections are made to the lower links. The mounting of the links to the front wall is perferably by a fixed pintle mounting such as elongate double ended rivet pin 68 of FIG. 3. The elongated rivet pin 68 is secured to the links 60 and 60a and to the front wall framing member 34 which supports the front wall padding in any convenient manner. A link pintle mounts links 62, 64 and the corresponding bottom links (not shown) to the front wall frame 34.

As shown, each link has a linear section 70 and a section 73 acutely angled from the linear section. In this way, the links 62, 64 when paired have a common pivot joint at the front pad assembly frame, and form a triangular support for the front support assembly. The angled portion of the link 62 of the link pair 62, 64 is stepped from the linear portion of the link in a horizontal plane as seen in FIG. 3.

Joining the front pad assembly to the rear pad assembly may be accomplished in a number of ways. The purpose of the joinder is to cover and house the separation spacing between assemblies without a gap into which objects might be placed or might fall. Shown is an accordion pleated fabric 71 which stretches to cover the expanded gap of FIGS. 3 and 5 and which is squeezed to the position of FIGS. 2 and 4. Also, stretch fabric or telescoping materials of a more rigid nature could be used in place of the accordion pleated material shown.

Figure 2:
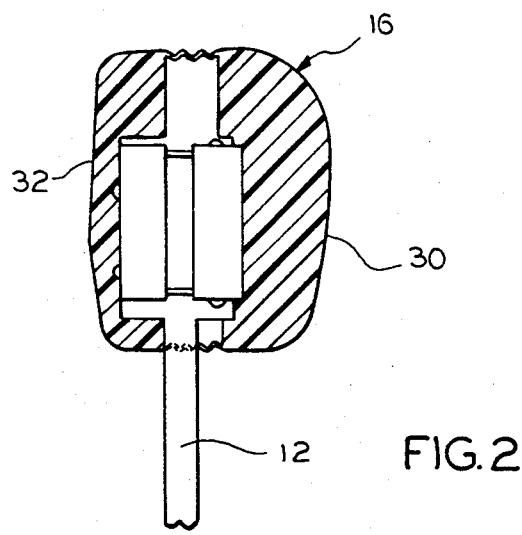
FIG. 2 is a sectional view taken along line 2—2 of FIG. 1, this figure showing the headrest in the retracted condition.

In operation, the headrest can be operated from the normal retracted position of FIGS. 2 and 4 to any intermediate position or to the fully advanced position of the front pad assembly shown in FIGS. 3 and 5 by suitable rotation of knob 20. Rotation of the knob rotates the screw thread shaft to move nuts 50 and 52 to the right (as shown in FIG. 4) and moved nut 54 to the left. The terminal position with the front pad fully advanced is shown in FIG. 5.

With both upper and lower links driven by the positive shaft drive and in triangular linkage, the front pad assembly is held firmly in the position to which set. The front pad will remain in the position to which set by the mechanism disclosed.

As shown in FIG. 5, when the front pad of the headrest is in the fully extended position the overlapping oppositely stepped acutely angled portions 73 of the links 62, 64 provide for intimate side-by-side abutment of the linear sections 70 of the links 62, 64. The positive longitudinal abutment of the links along their linear sections further provides for lateral stability of the front pad since the links are essentially forced and locked together against lateral movement.

Figure 6:
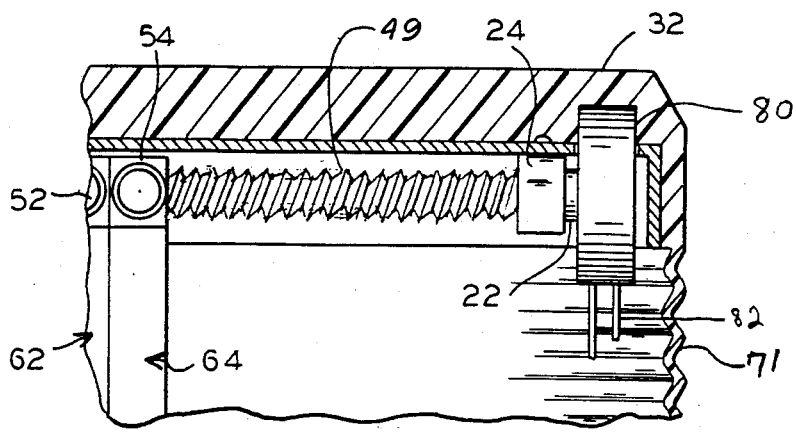
FIG. 6 is a partial view similar to FIG. 4 showing the motor driven embodiment of the invention.
Figure 7:
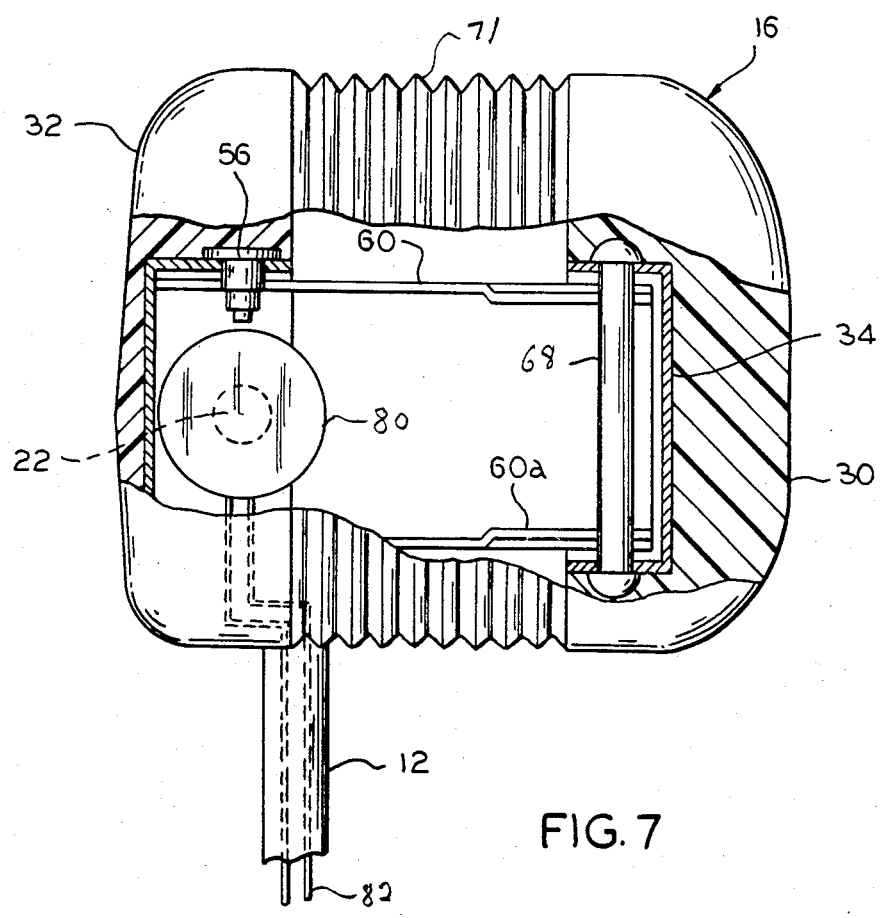
FIG. 7 is a sectional view similar to FIG. 3 showing the motor driven embodiment of FIG. 6.

In FIGS. 6 and 7, the motor driven embodiment is shown. The general construction features of the motor driven version are similar to the manual version of FIGS. 1–5 except that a reversible motor 80 with suitable gear reduction is connected to the shaft 22 to rotate the shaft accordingly. The motor is powered by leads 82 which may be threaded through mounting tube 12, the leads being connected to a source of power through a control switch (not shown). Suitable travel limits and other controls (not shown) may be built into the electrical control network.

Operation of the motor driven version is generally similar to that of the manual version. With a double throw control switch, actuation of the switch in a first direction causes rotation of the motor in one direction and rotation of the shaft 22 in one directional. Actuation of the switch in the opposite direction causes rotation of the motor in the opposite direction and rotation of shaft 22 in the reverse direction.

What is claimed is:

1. An adjustable headrest for use in an automotive vehicle seat, the headrest being adjustably extensible in a generally horizontal plane comprising:
   a rear section affixed above a back portion of said seat of the vehicle stationarily against horizontal movement relative to said back portion;
   a padded front section;
   means for mounting said padded front section for adjustable positioning relative to said rear section in said horizontal plane including;
   at least one pair of elongated links each having one end thereof pivotably attached to said front section at a common pivot point, means associated with said rear section for selectively, adjustably displacing a second end of each of said one pair of links in opposite directions along a common linear axis between fully spaced-apart locations defining a fully retracted position of said front section and locations defining a fully extended position of said front section, at least one additional link having one end thereof pivotably attached to said front section in spaced-apart relationship with said common pivot point of said one pair of links, and said means for displacing said second end of each of said one pair of links further providing for simultaneous displacement of a second end of said one additional link along said common linear axis between locations defining said fully retracted position and said fully extended position.

2. An adjustable headrest as claimed in claim 1 in which said means for displacing comprises, a transverse shaft defining said common linear axis with a control member at one end thereof for rotating said shaft on rotation of said control member, said shaft including a first screw thread defining a first thread direction along a first portion of its length, a second screw thread oppositely threaded from said first thread defining a second thread direction opposite to said first direction along a second portion of said shaft, a first internally threaded link driving member mated to said first screw thread portion and pivotably attached to said second end of one of said one pair of links, a second internally threaded link driving member mated to said oppositely threaded second thread and pivotably attached to said second end of the second of said one pair of links for displacing the second ends of each of said one pair of links in said first and second directions respectively, a third internally threaded link driving member mated to said second screw thread at a location spaced apart from said second driving member and pivotably attached to said second end of said one additional link for displacing said second end of said one additional link in said second direction.

3. An adjustable headrest as claimed in claim 2 wherein said pair of links each include a linear portion orientated parallel to the direction of movement said headrest in the fully extended position and a portion acutely angled relative to said linear portion, each said acutely angled portion affixed to said common pivot point and each said linear portion affixed to a respective one of said first and second driving members.

4. An adjustable headrest as claimed in claim 3 wherein one of said links is stepped at said acutely angled portion offsetting said acutely angled portion from said linear portion, whereby said linear portion of each of said pair of links lies in a common horizontal plane.

5. An adjustable headrest as claimed in claim 4 wherein said linear portion of each of said pair of links are in side by side abutment in the fully extended position of said headrest.

6. An adjustable headrest as claimed in claim 2 further comprising, a second pair of links spaced apart and vertically aligned with said one pair of links, one end of each of said second pair of links pivotably attached to said front member with a fixed pintle at said common pivot point, each of said first and said second threaded driving members respectively pivotably coupled to a second end of each of said second pair of links, a second additional link vertically spaced apart and aligned with said one additional link, one end of said second additional link pivotably attached to said front member, and said third threaded driving member pivotably coupled to a second end of said additional link.

7. An adjustable headrest as claimed in claim 2, in which said control member comprises a manually rotatable knob secured to said transverse shaft.

8. An adjustable headrest as claimed in claim 2 in which said control member comprises a reversible motor for rotating said shaft.

* * * * *